May 17, 1927.
J. F. JOY
LOADING MACHINE
Filed March 3, 1924
1,628,985
8 Sheets-Sheet 1
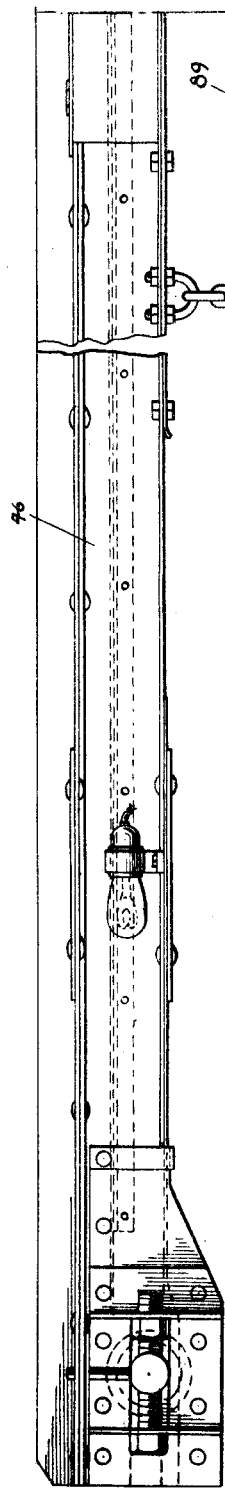
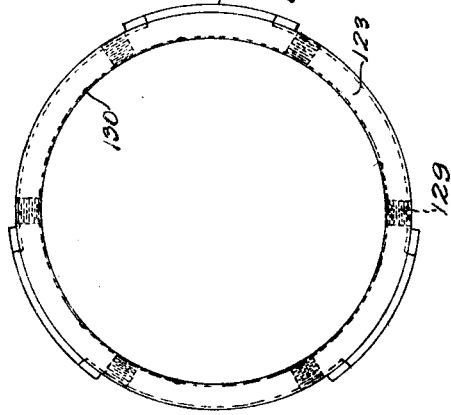
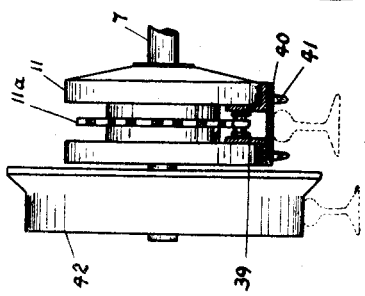
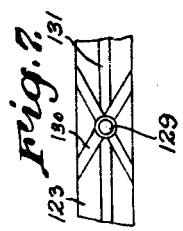
Inventor
Joseph F. Joy.
By J. Stanley Burch
Attorney May 17, 1927.
J. F. JOY
1,628,985
LOADING MACHINE
Filed March 3, 1924   8 Sheets-Sheet 2
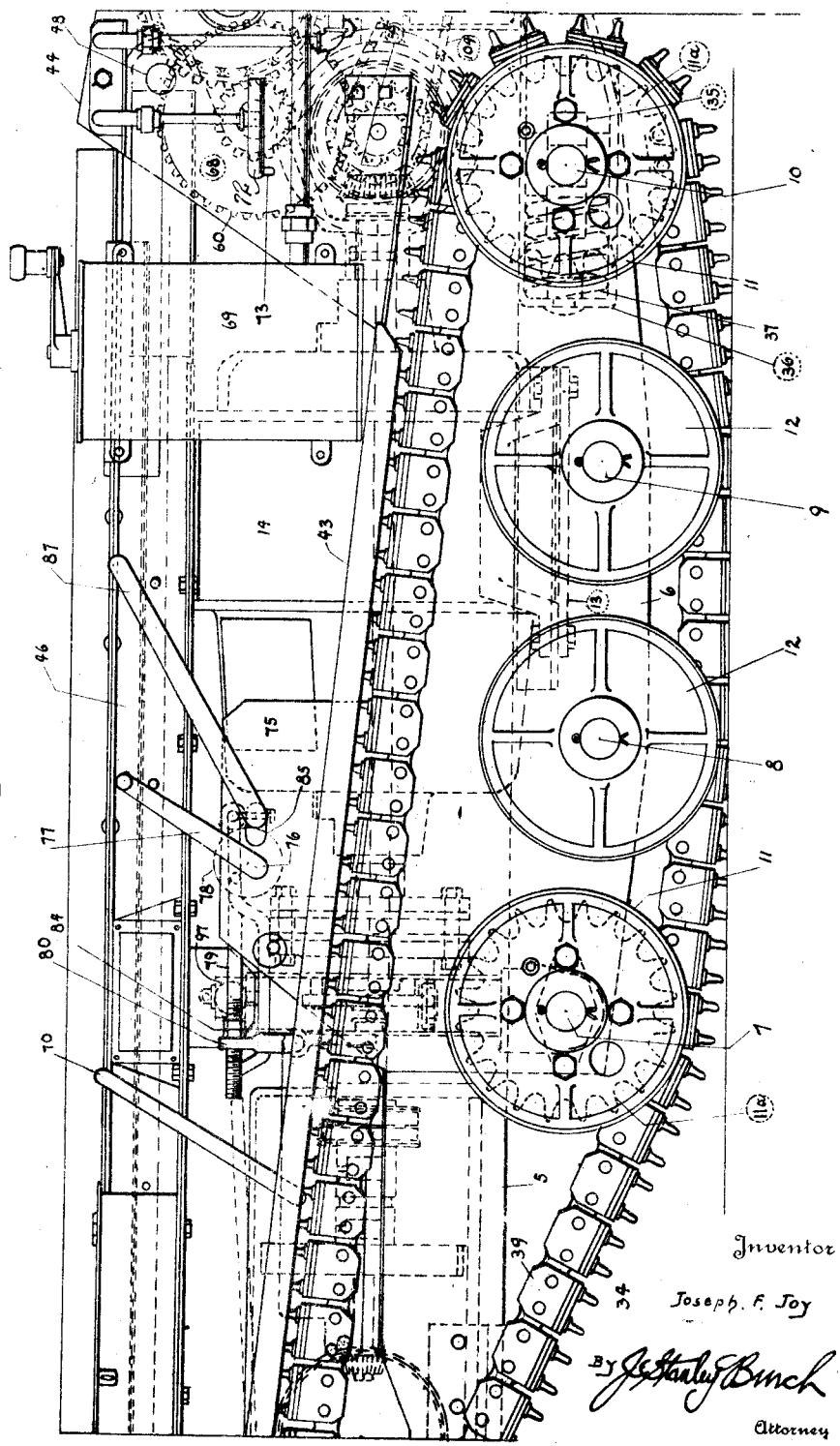
Inventor
Joseph F. Joy
By J. Stanley Bunch
Attorney

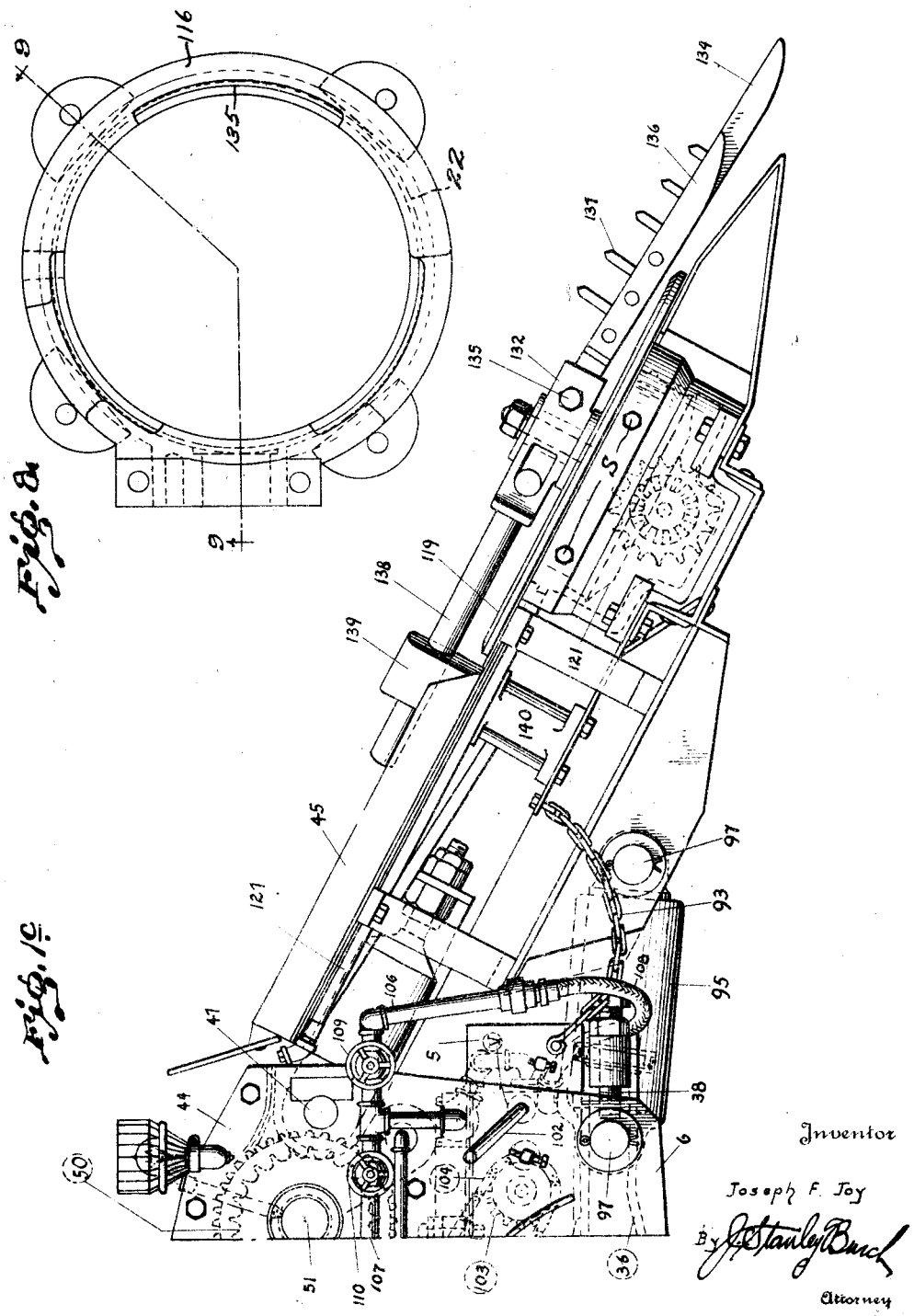

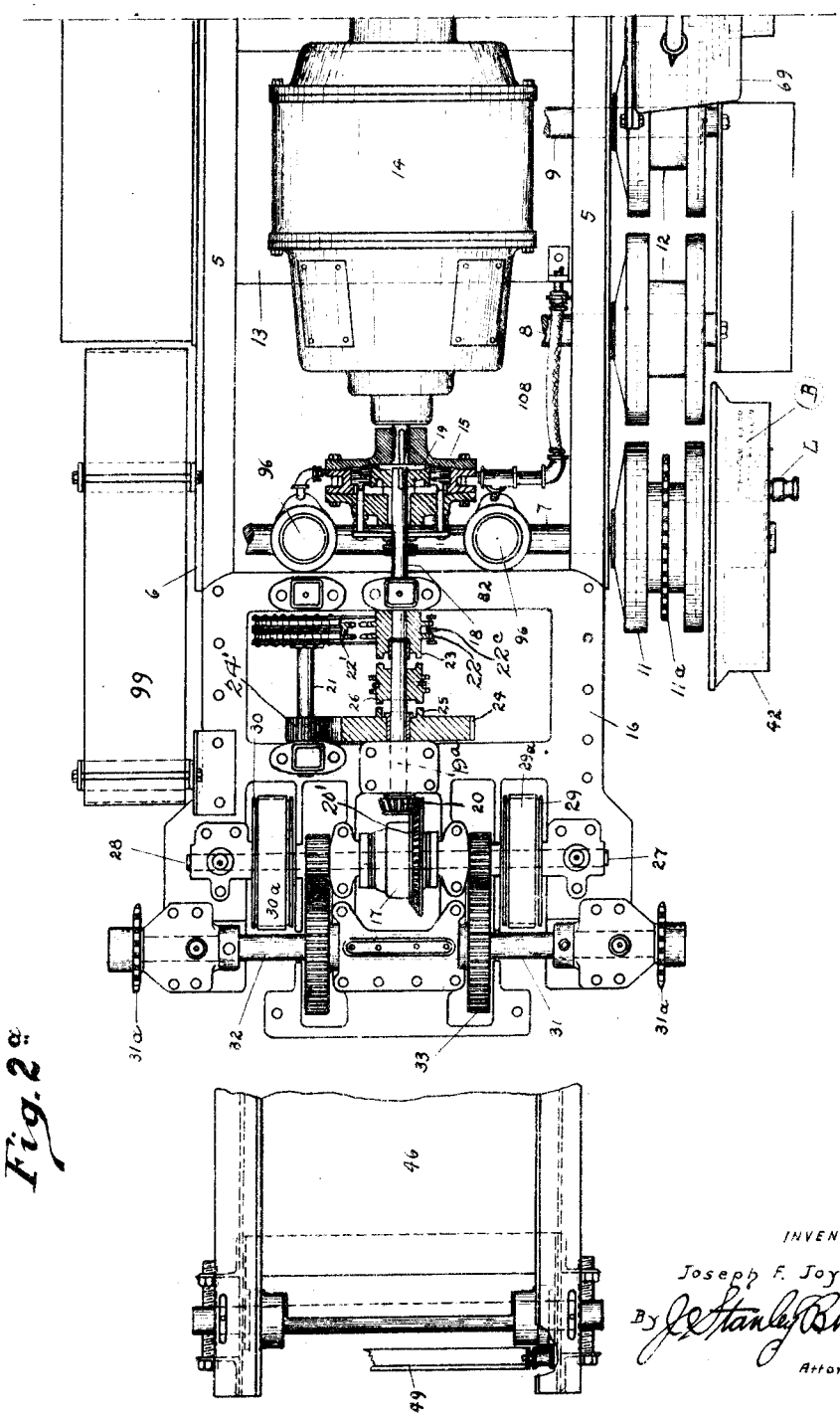

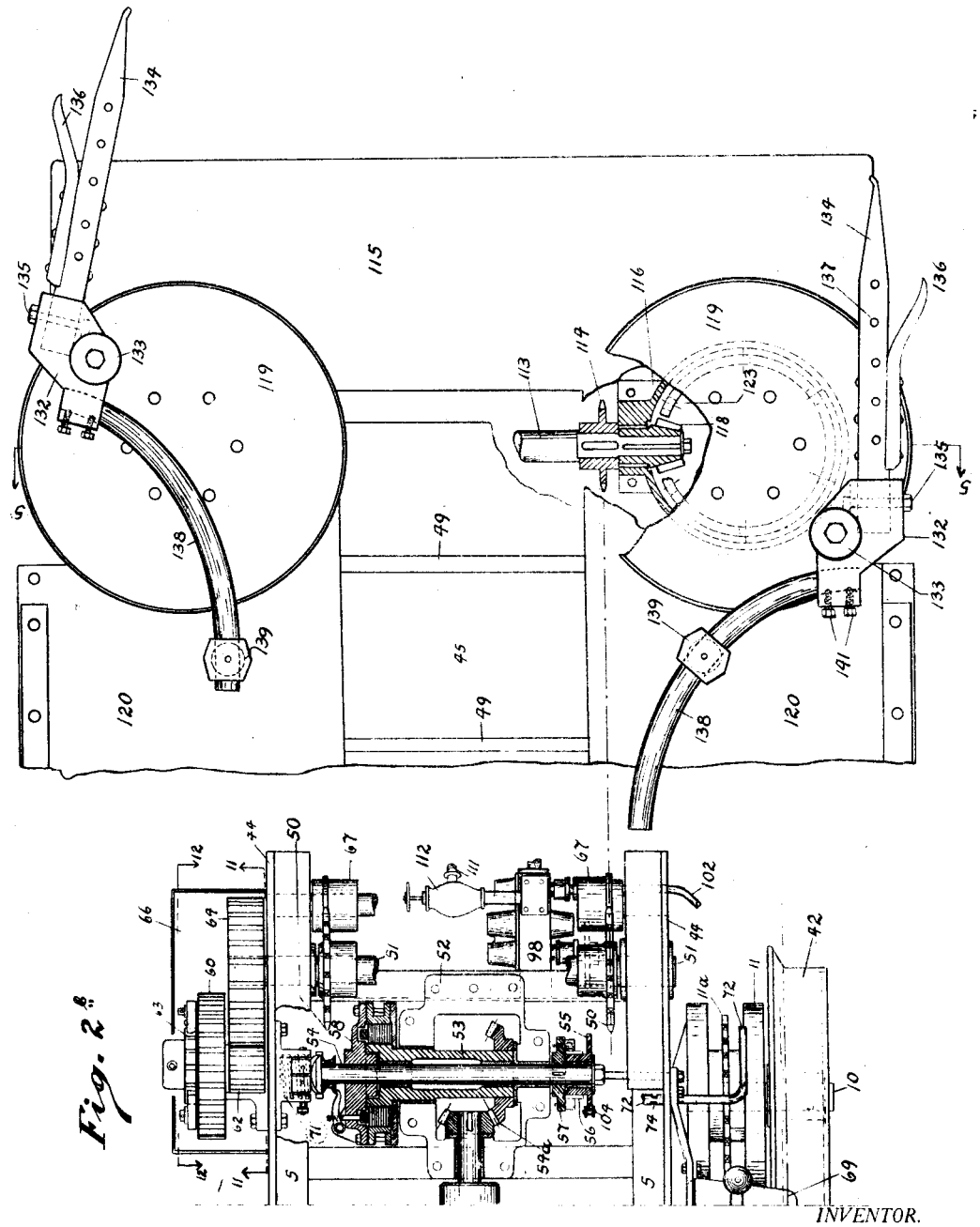

May 17, 1927.
J. F. JOY
1,628,985
LOADING MACHINE
Filed March 3, 1924    8 Sheets-Sheet 6
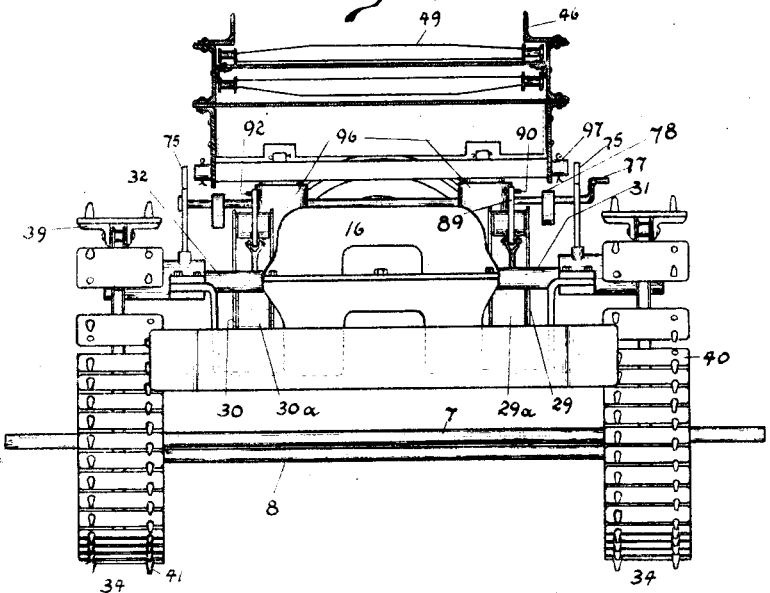
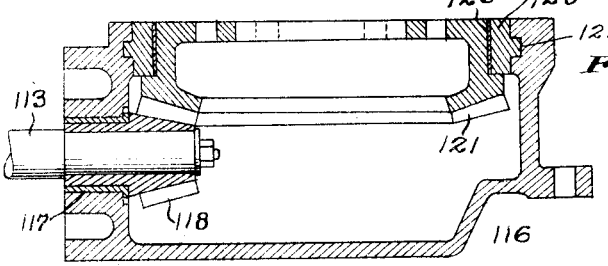
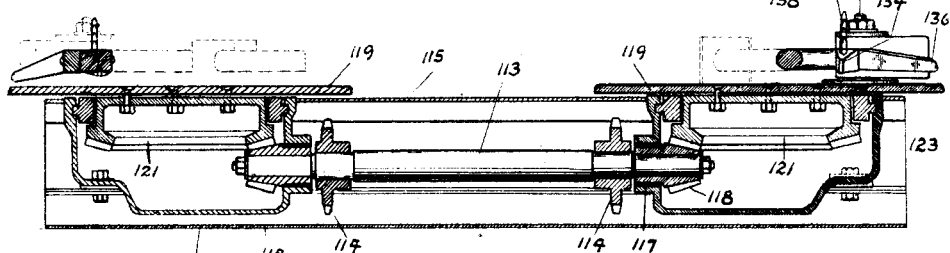
INVENTOR:
Joseph F. Joy.
By Stanley Burck
Attorney May 17, 1927.  J. F. JOY  1,628,985
LOADING MACHINE
Filed March 3, 1924   8 Sheets-Sheet 7
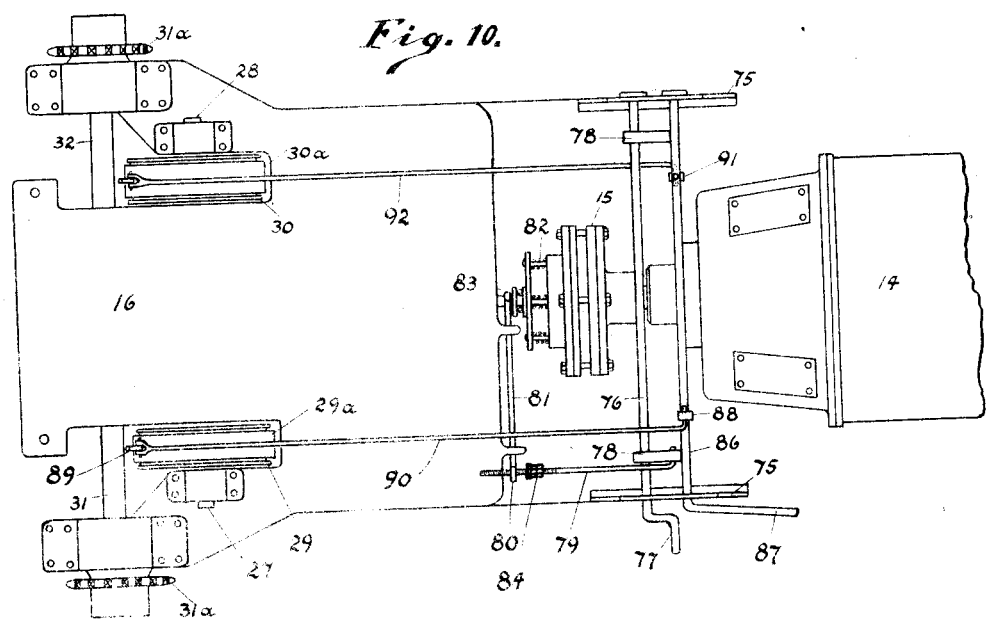
Fig. 10.
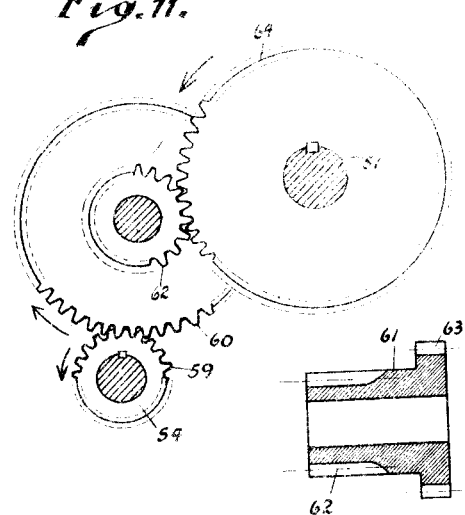
Fig. 11.
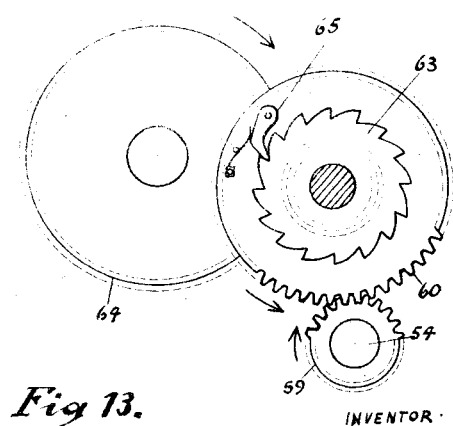
Fig. 12.
Fig. 13.
INVENTOR
Joseph F. Joy
By J. Stanley Burch
Attorney.

May 17, 1927.
J. F. JOY
1,628,985
LOADING MACHINE
Filed March 3, 1924
8 Sheets-Sheet 8
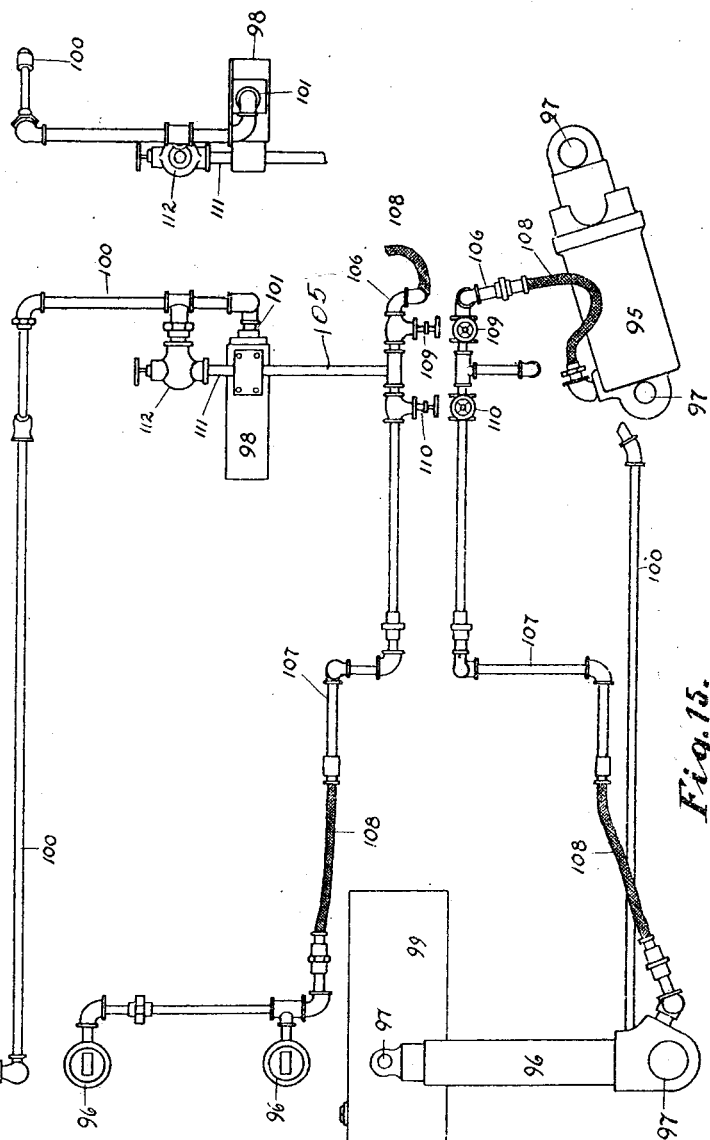
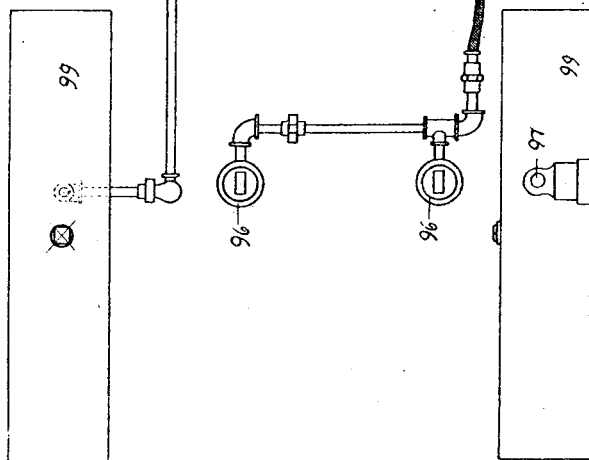
INVENTOR:
Joseph F. Joy.
By J. Stanley Burch
Attorney.

Patented May 17, 1927.

1,628,985

UNITED STATES PATENT OFFICE.

JOSEPH F. JOY, OF PITTSBURGH, PENNSYLVANIA, ASSIGNOR, BY MESNE ASSIGNMENTS, TO JOY MANUFACTURING COMPANY, OF FRANKLIN, PENNSYLVANIA, A CORPORATION OF DELAWARE.

LOADING MACHINE.

Application filed March 3, 1924. Serial No. 696,689.

This invention relates to certain new and useful improvements in loading machines, and has particular reference to machines of the type set forth in my U. S. Letters Patent #1,306,064 dated June 10, 1919.

The primary object of the invention is to provide a machine of the above kind embodying positive and thoroughly reliable coordinated mechanism for continuously breaking down the coal and loading it into the cars for transportation from the mine.

Another object is to provide a machine of this character which is of such exceedingly simple and durable construction as to insure a long period of usefulness underground.

Further objects are to provide a machine by means of which coal production may be greatly expedited with a minimum amount of manual labor; by means of which a good percentage of the coal will be produced in desirable lump form; and by means of which the coal may be won and loaded with the coal prepared by the conservative use of explosives, thereby insuring a minimum production of slack, and reducing such mining hazards as fires, explosions, production of dust, and roof disturbance.

A still further object is to provide a machine of the above kind having instantaneously responsive controlling devices that require only one attendant for their manipulation and that are of such simple form as to require no especially skilled help for placing the machine into practical use.

The invention contemplates the use of a pair of conveyor sections mounted in tandem relation upon a self-propelled chassis of the caterpillar or endless tractor type, the rear or loading conveyor section being provided with power-operated means for raising and lowering the same to enable loading into cars of any height, and the forward or elevating conveyor being provided with power-operated means to raise and lower the same together with the gathering mechanism for facilitating movement of the machine over irregularities in the mine floor and from one working place to another.

The invention further contemplates the provision of endless flexible traction elements for the self-propelled chassis adapted to travel upon narrow gage mine tracks as well as upon the mine floor, and the provision of detachable rail wheels for adapting the machine to travel upon wider gage tracks thus rendering it unnecessary to keep the tracks extended close to the working face and facilitating movement of the machine about the mine.

An especial object is to generally simplify and improve the form of gathering mechanism set forth in my above mentioned patent.

Other objects will appear as the nature of the invention is better understood, and the same consists of the novel form, combinations and arrangements of parts hereinafter more fully described, shown in the accompanying drawings and claimed.

In the drawings, wherein like reference characters indicate corresponding parts throughout the several views.

Figures 1ª, 1ᵇ, and 1ᶜ conjointly form a side elevational view of a machine constructed in accordance with the present invention, parts being broken away and in section.

Figures 2ª and 2ᵇ conjointly form a view of the machine shown in Figs. 1ª, 1ᵇ, and 1ᶜ, partly in plan and partly in horizontal longitudinal section, parts being broken away and removed.

Figure 3 is a fragmentary view, partly in elevation and partly in transverse section, showing one end of one of the rail wheel supporting axles and parts associated therewith.

Figure 4 is a view partly in transverse section and partly in rear elevation of the machine, parts being removed.

Figure 5 is a transverse sectional view of the gathering head taken substantially on line 5—5 of Fig. 2ᵇ.

Figure 6 is a plan view of one of the gathering head bearing rings.

Figure 7 is an inside fragmentary elevational view of the ring shown in Figure 6.

Figure 8 is a top plan view of one of the gathering head gear casings.

Figure 9 is a cross section on line 9—9 of Figure 8, with the gears and footshaft in place.

Figure 10 is a fragmentary plan view of the rear portion of the machine below the rear conveyor section, with parts removed.

Figure 11 is an enlarged sectional view taken on line 11—11 of Figure 2ᵇ.

Figure 12 is an enlarged sectional view taken on line 12—12 of Figure 2ᵇ,

Figure 13 is a longitudinal section of the combined spur gear and ratchet wheel used in the gearing of Figures 2b, 11 and 12.

Figure 14 is a diagrammatic plan view of the hydraulic jack system used for raising the conveyor sections, parts being broken away and removed.

Figure 15 is a side elevational view of the construction shown in Figure 14 with other parts added and broken away, and Figure 16 is a view looking toward the left of Figure 14.

Referring more in detail to the drawings, the present invention embodies an automotive organization which comprises a self-propelled chassis, the frame of which includes side rails 5 having upright frame plates 6 rigidly secured against the outer sides thereof, the lower portions of said plates 6 projecting below the side rails 5 and having pairs of transversely alined openings in which are secured four transverse axles 7, 8, 9, and 10, having their ends projecting outwardly beyond the plates 6. Journaled and suitably retained upon the projecting portions of the axles 7 and 10 are combined sprocket wheels and guiding and supporting rollers 11 and journaled upon the ends of axles 8 and 9 are guiding and supporting rollers 12. It will be noted that the axles 7 and 10 are disposed in the same plane and that the axles 8 and 9 are also in the same plane, the axles 8 and 9 being lower than the axles 7 and 10.

Rigidly connecting the frame plates 6 directly below the rails 5 is a platform 13 upon which is secured a motor 14, preferably electric, having a longitudinally arranged power shaft with forwardly and rearwardly projecting end portions. The casing 15 of a multiple-disk friction clutch is secured on the rear end of the motor shaft as shown in Fig. 2a. A housing 16 is mounted upon and rigidly connects the rear ends of the frame rails 5, and within the forward end portion of this housing is a reversing gearing, while within the rear end portion of said housing is a differential gearing 17.

The reversing gearing shown comprises two axially alined shafts 18 and 19a. Keyed to the end of shaft 18 in juxtaposition to the adjacent end of said shaft 19a is a sprocket pinion 22 the hub of which is provided with the jaws 23 for cooperation with the sliding clutch member 26 that is splined to the shaft 19a. Revolubly mounted upon said shaft 19a is a spur gear 24, which is also provided with jaw members 25 adapted for engagement and co-operation with jaw members upon said clutch body 26.

Revolubly mounted within said housing 16 and in parallel relation to said shafts 18 and 19a is a jack shaft 21, which has a sprocket gear 22' rigidly mounted thereon for co-operation with the sprocket pinion 22 through the chain 22c. Keyed to said jack shaft 21 is a spur-pinion 24' arranged in mesh with the gear 24. Said shaft 19a has a bevel pinion 20 keyed thereon in mesh with the bevel gear 20' of differential gear 17.

As previously stated the clutch member 26 is splined to its shaft 19a and is slidable thereon into engaging relation with either of said clutch member 23 or 25. Said clutch body 26 is shown in the neutral or intermediate position, in the drawings, and when so placed, no motion is transmitted to the shaft 19a, but when the clutch body 26 is engaged with hub 23 shaft 19a is driven in unison with shaft 18; conversely, when clutch body 26 is placed in engagement with the member 25, the direction of rotation of said shaft 19a is reversed, inasmuch as the drive is now transmitted through the jack shaft 21.

The differential gearing 17 operatively connects a pair of alined transverse shaft sections 27 and 28 upon which are mounted brake drums 29 and 30 having flexible split brake bands 29a and 30a, and disposed rearwardly of the shaft sections 27 and 28 are a pair of alined transverse drive shafts 31 and 32, each of which is operatively connected to one of the shaft sections 27 and 28 by means of a spur gearing 33. The gearings 33, the gearing 20 and 20', the differential gearing 17 and the reversing gearing all run in a bath of oil within the housing 16, and secured upon the outer ends of the drive shafts 31 and 32 are sprocket wheels 31a each of which is alined with the intermediate sprocket wheel portions 11a of the combined sprocket wheels and guiding and supporting rollers 11 at the adjacent side of the machine. Passing around the rollers 11 and 12 and the sprockets 31a at each side of the machine is an endless flexible traction element or a caterpillar tread 34.

The axle 10 is mounted in horizontal elongated slots in the forward lower portions of the frame plates 6 as indicated by dotted lines at 35 in Fig. 1b and mounted against the inner sides of the plates 6 are yokes 36 which loosely embrace the adjacent portions of the axle 10. Compression springs 37 are carried by the yokes 36 and bear at their forward ends against the axles 10 to urge the latter forwardly and thereby yieldingly maintain the traction elements 34 taut. Adjusting screws 38 are carried by the forward ends of the yokes 36 and bear against the forward side of a pivot rod 97 whereby said screws 38 may be adjusted for varying the compression of springs 37.

Each traction element 34 consists of a sprocket chain having a series of tread members secured thereto, each tread member comprising a pair of angle plates 39 secured to opposed outer links of said sprocket chain and having a tread plate 40 secured thereto, outwardly projecting calks 41 being rigidly carried by said tread plate. The calks 41 of each endless traction element are spaced to depend at each side of the ball of a track rail when said endless traction elements are disposed on the rails of a narrow gage track, thus acting as the equivalent of the flange of a rail wheel.

The axles 7 and 10 project outwardly beyond the traction elements 34 for removable reception of rail wheels 42 which are only employed when the gage of the track is wider. These wheels 42 are suitably secured by pins L, having latch bolts B, to the rollers 11 so as to be driven thereby. Guards 43 are fixed above the endless traction elements 34 so as to protect the operator from injury by contact with the latter.

The frame plates 6 are provided with upward extensions 44 at their forward ends, and mounted upon the chassis is a longitudinally arranged coal elevating and car loading conveyor having a gathering mechanism on the forward lower end thereof, said conveyor including vertically swinging forward and rear frame section 45 and 46 respectively that are pivoted in spaced relation as at 47 and 48 upon fixed transverse bars connecting the frame plate extensions 44. The conveyor is of the general detailed construction as set forth in my above mentioned patent and is accordingly of the chain and scraper type embodying a pair of endless sprocket chains that are connected at intervals by transverse scraper bars 49 and engage sprocket wheels 50 fixed upon a transverse shaft 51 journaled in the frame plate extensions 44 between the bars 47 and 48.

Mounted upon the chassis between the side rails 5 forwardly of motor 14 is a housing 52 into which the forward end of the shaft of motor 14 projects, and journaled in one side of this housing is a transverse tubular shaft 53, the inner end of which is operatively conected to the shaft of motor 14 by means of a bevel gearing 54$^a$. Journaled in and projecting through the other side of the housing 52 is a shaft 54 upon the adjacent projecting end of which is journaled a sprocket wheel 55 having a ratchet wheel 56 rigid therewith, the teeth of the ratchet wheel 56 being engaged by a spring pressed pawl pivoted upon a side of a disk 57 keyed upon said shaft 54.

The shaft 54 projects through the tubular shaft 53 and has the casing 58 of a multiple-disk friction clutch keyed thereon, the hub of said clutch being formed by the adjacent end of shaft 53. The shaft 54 also projects outwardly beyond the clutch casing 58 and is journaled in and projects through the adjacent frame plate extension 44 beneath the rod 48 where it has a spur gear 59 secured thereon. A large spur gear 60 is disposed above and in mesh with the gear 59, and this gear 60 is journaled upon a tubular shaft member 61 that rigidly connects a spur pinion 62 with a ratchet wheel 63. The spur pinion 62 meshes with a large spur gear 64 that is secured on the adjacent end of shaft 51, and the teeth of the ratchet wheel 63 are engaged by a spring-pressed pawl 65 pivoted to the outer side of gear 60. A gear casing is employed as at 66. Idlers 67 are journaled on rods 47 and 48 to maintain the upper and lower strands of the conveyor chains in engagement with the sprocket wheels 50 so that said chains will be effectively driven. The gearing thus described will cause the upper scraper bars 49 to travel rearwardly for elevating the coal and discharging it into the mine cars, but, due to the ratchet mechanism 64, 65, undesirable forward movement of the upper scraper bars is prevented when the motor is reversed.

A controller 69 for the motor 14 is mounted on the chassis at one side of the machine, and the clutch element 26 is operated by a lever 70 disposed at the same side of the machine.

The clutch operatively connecting the shafts 53 and 54 is normally engaged by means including an actuating spring 71 and is released by means including a pull rod 72 having a handle disposed adjacent the controller 69. The rod 72 works in a key hole slot 73 in one of the frame plate extensions 44 and is reduced upon opposite sides as at 74 to enter the reduced portion of said slot to maintain this clutch released or disengaged against the action of the spring 71. Release of this clutch will obviously render the conveyor inoperative.

Mounted upon the sides rails 5 between the motor 14 and the housing 15 are a pair of upright plates 75 in which is journaled a transverse rock shaft 76 having one end extended to form a handle on lever 77 at the side of the machine where the controller 69 is located. A pair of spaced cams 78 are fixed on the shaft 76, and pivoted at its forward end to one of the cams 78 is a rod 79 the rear end of which loosely and slidably projects through the end of an upstanding arm 80 rigid with a second rock shaft 81. The clutch including the casing 15 is normally released or disengaged by springs 82 and is engaged by means of an arm 83 fixed on the inner end of shaft 81, when the lever 77 is swung rearwardly, by reason of an adjustable abutment 84, fixed on the rod 79, forwardly of the arm 80.

Rotatable and slidable in horizontal elongated slots 85 provided in the plates 75 is a further rock shaft 86 that is engaged by the peripheries of the cams 78 and that has an operating lever 87 at one end adjacent the lever 77. The shaft 86 has an upstanding arm 88 that is operatively connected to the operating arm 89 (Fig. 1ª) of the brake band 29ª by means of a rod 90, and also has a depending arm 91 that is connected to the operating arm of the brake band, 30ª, by means of a rod 92. It is thus apparent that the band 29ª will be tightened when the lever 87 is swung forwardly while the band 30ª is simultaneously loosened, thereby causing the traction element 34 at one side of the machine to remain still and the other to travel. It is also obvious that when the lever 87 is swung rearwardly, the band 29ª will be loosened and the band 30ª simultaneously tightened. This causes steering of the machine in a generally well known manner when the lever 77 is swung rearwardly for engaging the clutch including the casing 15. With the lever 87 in a neutral position, the bands 29ª and 30ª will be similarly loosened to cause the machine to travel in a straight path. By swinging the lever 77 forwardly, the cams 78 will move the shaft 86 forward bodily and cause both brake bands to be applied as the clutch is released for stopping travelling of the machine.

The upward swinging movement of the conveyor frame sections 45 and 46 is limited by chains 93 and 94, and hydraulic jacks 95 and 96 are provided for causing them to so swing. The pistons and cylinders of these jacks are hinged at their outer ends to the chassis and the conveyor frame sections as at 97 so as to accommodate for the change in the relative angular positions of these parts when the conveyor frame sections are raised and lowered.

Mounted upon the forward end of the chassis beneath the rear end of the forward conveyor section 45 is a conventional hydraulic pump 98 preferably of the rotary geared-piston type. A hydraulic reservoir 99 is rigidly mounted on the chassis and has an outlet connected by piping 100 to the inlet 101 of the pump 98 which pump inlet is controlled by a turn-plug valve V operable by the hand lever 102 (Fig. 1ᶜ) disposed forward of and at the same side of the machine as the controller 69. The drive shaft of the pump 98 has a sprocket wheel 103 secured thereon, and an endless sprocket chain 104 passes around this sprocket wheel 103 as well as around the sprocket wheel 55 journaled on the shaft 54. The ratchet mechanism at 57 causes operation of the pump 98 when the shaft 54 is driven in the proper direction to cause rearward movement of the upper scraper bars 49, but will prevent undesirable operation of the pump when the motor and the shaft 54 are reversed. The outlet chamber of the pump 98 has opposed outlet ports, one of which is connected by a piping 105 with supply lines 106 and 107 that respectively lead to the inlet of the jack 95 and the inlets of jacks 96 as shown in Figs. 1ᶜ, 14 and 15, and that include flexible pipe sections 108 to allow the jacks to freely swing on their pivots 97. Adjacently positioned cut-off valves are provided as at 109 and 110 for the supply lines 106 and 107. When the pump 98 is in operation no fluid will be pumped from the reservoir 99 with the valve V closed, but when this valve is opened, the fluid will be supplied under pressure to the front jack 95 when the valve 109 is opened and to the rear jacks 96 when the valve 110 is opened, thus effecting raising of the conveyor section 45 or 46, or both, as desired.

The remaining outlet port of pump 98 is connected by a by-pass piping 111 with the piping 100 and in this piping 111 is a spring-seated check or safety valve 112, of conventional form. It is thus apparent that when the chains 93 and 94 stop the upward swinging movement of the conveyor sections 45 and 46, the increased pressure in the outlet chamber of pump 98 will cause the valve 112 to open so that the fluid may circulate through the pump and through the by-pass from the outlet to the inlet of said pump for relieving this pressure and thereby preventing damage therefrom.

When the valve V is half way between open and closed positions communication is established directly between the inlet and outlet of the pump 98 while communication is cut off between the piston chamber of said pump and said inlet and outlet, so that the fluid will exhaust from the jacks to the reservoir 99, thus allowing the conveyor sections 45 and 46 to lower by gravity.

The conveyor has a driven footshaft 113 equipped with sprocket wheels 114 about which the conveyor chains pass as set forth in my above mentioned patent, and carried by the lower forward end of the inclined coal elevating conveyor section 45 is a gathering mechanism of the type also disclosed in my said patent. This gathering mechanism consists of a head embodying a shoe or apron 115 rigid with the conveyor section 45 and projecting beyond opposite sides of the latter, the projecting portions thereof being formed with pockets in which are fixed open-top gear casings 116. The gear casings 116 are formed with openings 117 in their adjacent sides into which the ends of the foot-shaft 113 project. Bevel pinions 118 being secured on the ends of said shaft 113 and disposed within the housings or casings 116. Crank disks 119 cover the casings 116 and rest upon the shoe 115 and the platforms 120 which are secured to the sides of the conveyor section 45 rearwardly of the casings 116 flush with the upper surface of said shoe 115. Large bevel gears 121 are secured concentrically of and to the under sides of the disks 119 and these gears 121 are journaled in the casings 116 and mesh with the pinions 118. As shown in Fig. 9, each gear casing, 116 has an internal annular groove 122 formed in the upper portion thereof, and fitted in the upper portion of said gear casing and secured by set screws S (Fig. 1ᶜ) or the like, is a bearing ring 123 that is formed with alined peripheral spaced segmental ribs 124 that are disposed in the groove 122. The upper wall of the groove 122 is cut away as at 125 so as to permit removal of the ring 123 when given a partial turn to aline the ribs 124 with said cut away portions. The gears 121 have reduced hub portions 126 which revolubly fit in the rings 123, and the surfaces are lubricated by pouring a lubricant in oil pipes 127 (Fig. 1ᶜ) that are secured in openings of the gear casings 116, the openings of each gear casing being alined with one of the openings 129 of the adjacent bearing ring 123. For facilitating flow of the lubricant to the surfaces of the gears 121 and the bearing rings 123, the latter have internal crossed oil grooves 130 and an annular groove 131 that intersect the openings 129.

The gathering mechanism embodies a pair of gathering arms, each including a hub member or bracket 132 pivoted as at 133 upon a pivot pin rigid with and projecting upwardly from the adjacent disk 119, the member 132 having a finger 134 of pick blade formation pivoted to one end thereof for vertical swinging movement as at 135, and the inner end of the finger 134 being loosely disposed in a socket of the bracket 132 so that the vertical swinging movement of the finger is limited. Attached to the outer side of the main finger 134 is a small finger or cutter 136 that serves to assist the main finger in loosening and breaking down or dislodging the coal, and this action of the finger is further assisted by upwardly projecting bits 137, secured to the main finger 134. A curved guide bar 138 is rigid with and extends laterally from the bracket member 132 of each gathering arm, and these guide bars 138 slidably extend through swiveled guides 139 that are mounted in bearings 140 to rotate about substantially vertical axes parallel with the pivots 133. The rotation of the footshaft 113 is thus transmitted to the disks and the gathering arms caused to travel in substantially reniform orbital paths as set forth in my above-mentioned patent. The present construction of gathering head is durable and the parts are effectively protected and lubricated. The platforms 120 prevent the coal from falling over the sides of the lower portion of the conveyor section 45 and present a picking table from which slate and other foreign matter may be removed by an assistant while the machine is in operation. The ends of the guide bars 138 are secured in transverse openings or sockets of the brackets 132 by means of screws 141.

The operation of the several mechanisms has been explained as the description proceeded and the purposes thereof have also been outlined in the statement of objects and the specific description. The general manner of using the machine is the same as that set forth in my above-mentioned patent.

Minor changes may be made without departing from the spirit and scope of the invention as cleamed.

The guide bars 138 swing across the platforms 120 when the gathering mechanism is in operation, and sweep such coal as may fall onto said platforms inwardly off the latter in the path of the conveyor scraper bars 49.

As a brief résumé of the foregoing specification, it is pointed out that the automotive carrying structure for the elevating conveyor 45, and the loading conveyor 46, comprises a single, rigid and substantially unitary truck-frame or chassis which carries rigid bearings for the tractive elements of said automotive structure; that said elevating conveyor is attached to said frame in such manner as to be horizontally rigid relative to said frame, (that is to say, it has no laterally-swinging movement relative thereto; that for the purpose of providing for the necessary horizontal, radial swing of said conveyor, for the purpose of negotiating and maneuvering its gathering mechanism into actuative relation to the material to be gathered, the endless, flexible traction elements 34 on the respective sides of the loader are adapted to be operable so as to cause the loader as a whole to turn pivotally upon one or the other of said elements, thus effecting a radial swing of said elevating conveyor. In this manner, a rugged, efficient, facile and economically-maintained gathering mechanism is attained, the operation of which differs materially from those heretofore produced, since, as heretofore constructed, the gathering section of the elevator has been mounted upon a supplementary pivotal frame, which, in turn, is mounted upon a main carrying frame in such manner as to have horizontal swinging movement thereon.

What I claim as new, is:

1. In a coal loading machine, a gathering mechanism including a gathering conveyor, adapted to gather coal from the floor of a mine, a vertically flexible main gathering finger arranged in normal parallel relation to the upper face of said gathering conveyor means causing the coal gathering actuation of said finger, and an auxiliary smaller finger rigidly carried by said main finger positioned at the outer side of and terminating inwardly of the free end of said main finger.

2. In a loading machine of the class described, an inclined conveyor having a driven transverse foot shaft provided with pinions, an apron on the forward lower end of said conveyor, gear casings, rigid with said apron and into which the ends of said foot shaft project, detachable bearing rings mounted in the upper portions of said gear casings, disks covering the gear casings, bevel gears rigidly attached to the undersides of said disks and journaled in said bearing rings in mesh with said pinions, gathering arms pivoted eccentrically on said disks and having guide bars, and swiveled guides for said guide bars.

3. In a coal loading machine, an inclined gathering and elevating conveyor comprising a frame section, conveying mechanism therefor consisting of endless sprocket chains carrying intermediately-positioned scraper bars, a revoluble foot-shaft positioned at the lower end of said frame section and disposed transversely of said conveyor, sprockets keyed to said foot-shaft with which said chains are operably engaged, a pinion keyed to each end of said shaft, gear casings rigidly mounted adjacent the lower end of said frame in juxtaposition to and provided with bearings for the ends of said shaft, bearing rings revolubly and detachably mounted in said gear casings, disks fixed to the upper face of said bearing rings, bevel gears fixed to the under side of said disks in mesh with said pinions respectively, a crank pin carried by each of said ____s, a guide pivotally mounted rearwardly ___ said disks, a gathering device carried by said crank pin, and a guide-arm carried by said device in cooperation with said guide, all adapted and operating substantially as and for the respective purposes specified.

4. In a loading machine of the class described, an inclined conveyor having a driven transverse foot shaft provided with pinions, an apron on the forward lower end of said conveyor, gear casings rigid with said apron and into which the ends of said foot shaft project, detachable bearing rings mounted in the upper portions of said gear casings, disks covering the gear casings, bevel gears rigidly attached to the undersides of said disks and journaled in said bearing rings in mesh with said pinions, gathering arms pivoted eccentrically on said disks and having guide bars, and swiveled guides for said guide bars, said gear casings having grooves whose upper walls have portions cut away, said bearing rings having external segmental ribs projecting into said grooves and removable through the cut away portions of the upper walls of the latter.

In testimony whereof I affix my signature.

JOSEPH F. JOY.